United States Patent [19]

Sadan

[11] 3,967,930

[45] July 6, 1976

[54] SEPARATION OF COMPLEX POTASSIUM SALTS FROM BRINE EVAPORITES

[75] Inventor: Abraham Sadan, Salt Lake City, Utah

[73] Assignee: N L Industries, Inc., New York, N.Y.

[22] Filed: Nov. 18, 1974

[21] Appl. No.: 524,485

[52] U.S. Cl. .................................. 23/296; 23/298; 23/300; 23/302 R; 23/303; 423/179; 423/551
[51] Int. Cl.² ........................ B01D 9/04; C01D 5/00
[58] Field of Search .................. 23/296, 297, 295 S, 23/298, 299, 302 R, 303, 304, 300; 423/551, 179

[56] References Cited
UNITED STATES PATENTS

| | | | |
|---|---|---|---|
| 1,476,873 | 12/1923 | Burnham | 23/295 S |
| 1,589,680 | 6/1926 | Burnham | 23/303 X |
| 3,003,849 | 10/1961 | Veronica | 23/304 X |
| 3,365,278 | 1/1968 | Kelly et al. | 23/302 X |
| 3,499,725 | 3/1970 | Scarfi et al. | 23/302 X |
| 3,615,259 | 10/1971 | Neitzel | 23/298 |
| 3,642,454 | 2/1972 | Nylander | 23/298 X |

*Primary Examiner*—Morris O. Wolk
*Assistant Examiner*—Barry I. Hollander

[57] ABSTRACT

Evaporite minerals comprising mixtures of relatively coarse salts are treated in a manner such that certain of said salts are converted by recrystallization to very finely divided form and then separated from the coarse salts by size classification such as elutriation, the treatment being especially useful in a process for the recovery of potassium sulfate from marine evaporite mixtures such as kainite and halite.

6 Claims, No Drawings

SEPARATION OF COMPLEX POTASSIUM SALTS FROM BRINE EVAPORITES

BACKGROUND OF INVENTION

By far the largest sources of potassium salts are marine brines and the evaporite salts formed by the evaporation of marine brines. These brines are found worldwide and have been formed under various conditions so their compositions are quite varied. Most potassium salts are recovered as potassium chloride since this compound is frequently found unaccompanied by more than one or two other salts in major proportions. In such cases, the separation of a commercially pure potassium chloride is relatively inexpensive. However, potassium salts are widely used as a fertilizer and for this use there is a strong preference for potassium sulfate over potassium chloride, especially with crops such as citrus fruits and tobacco. In fact, the demand is great enough that potassium sulfate is frequently manufactured from potassium chloride at considerable expense.

Potassium sulfate can be recovered also from many natural deposits of salts or from many salt mixtures obtained by evaporation of natural brines. However, potassium sulfate production from such sources is usually complex because of the presence of many other salts in significant proportions. Indeed, in such salt mixtures the potassium is almost always present chemically combined with another salt in a "double salt;" for instance, as langbeinite, kainite or glaserite, which salts are representative of a large group of double salts containing potassium. Many schemes have been presented for separating potassium sulfate from various mixtures of these salts. One type of separation process depends on solubility relationships which are complex and generally give poor yields. Another group of separation processes may be termed mechanical; flotation and tabling are examples. In the case of potassium sulfate, a mechanical type of separation step is frequently combined with a solubility process step in order to make the latter more efficient. Mechanical methods of separation usually have reasonably good yields. However, they usually require grinding the salt mixture and inasmuch as the salt mixture frequently must be ground extremely fine, the grinding step becomes quite expensive.

So, in general, it may be said that there are many kinds of deposits from which potassium sulfate may be recovered; and there are many known processes or combinations of processes which can be used in such recovery. However, all such processes that have been tried commercially have significant drawbacks. It is desirable, therefore, to provide a simple and economical process for separating certain double salts containing potassium from other salts occurring in brine evaporites; and to use this novel separation process in an improved process for recovering potassium sulfate from mixed salts formed by solar evaporation of marine brines.

SUMMARY OF INVENTION

In its broadest aspects the instant invention relates to treatment of brine evaporites in the form of mixtures of various kinds of relatively coarse salts in a manner such that certain selected salts are converted by recrystallization to relatively fine crystals which may then be cleanly separated from the remaining salts by a simple and inexpensive separation step; and its application to a process for recovering potassium sulfate from mixed salts deposited from marine brines.

More particularly, the method of this invention is especially applicable to the treatment of salt deposits, sometimes hereinafter referred to as harvest salts, derived from Great Salt Lake brines and comprising essentially a mixture of kainite ($MgSO_4 \cdot KCL \cdot 3H_2O$) and sodium chloride, and is characterized by two relatively simple process steps identified as a recrystallization step and a separation step. As applied to the recovery of potassium values from these salt mixtures it has now been discovered that when the double salt kainite is heated above 80°C, it is changed into a salt mixture comprising essentially langbeinite ($2MgSO_4 \cdot K_2SO_4$), carnallite ($KCl \cdot MgCl_2 \cdot 6H_2O$), and brine; and that when the transformation is effected rapidly, as for example by heating the salts well above 80°C, the langbeinite, carnallite mixture comes down in the form of relatively fine crystals, whereas the sodium chloride remains unaffected, that is to say comprises relatively coarse crystals. As the result of this crystal size differential, separation of the finely divided langbeinite and carnallite crystals from the relatively coarse sodium chloride crystals can be affected using any known means for separation according to particle size as for example hydraulic classification, screens and the like. However, the preferred method of separation is be elutriated as hereinafter described.

Once the relatively finely divided langbeinite and carnallite have been separated from the sodium chloride the langbeinite and carnallite may then be processed, according to known methods, for recovering its potassium values as potassium sulfate using for example a solubility type process such as outlined in Volume 16, pages 383 and 455 of the Kirk Othmer Encyclopedia of Chemical Technology, 2nd edition.

PREFERRED EMBODIMENT OF THE INVENTION

By way of illustrating a preferred embodiment of the invention the following description details its application to the recovery of potassium values in the form of the double salt kainite substantially free of sodium chloride from harvest salts derived from Great Salt Lake brines.

It is well known of course that these naturally occurring lake brines are quite concentrated. Relatively pure sodium chloride is commonly recovered from the lake brine by solar evaporation. If, following recovery of the sodium chloride, the brine is pumped to another pond and further evaporated a potassium-containing mixture of salts will precipitate. The composition of this mixture is affected by the way the evaporation is done and principally by the extent of evaporation, that is to say, the percentage of water removed; and a generally acceptable evaporating process such as described in U.S. Pat. No. 3,432,031 will effect precipitation of a mixture of salts consisting largely of sodium chloride and kainite with minor amounts of other salts.

However, the greatest difficulty encountered in effecting a clean separation of these several salts is due to the presence of the sodium chloride. One method of separating sodium chloride from kainite is disclosed in U.S. Pat. No. 3,432,031, Ferris, Mar. 11, 1969, wherein the salt harvested from a solar evaporation pond is ground, crushed, ball-milled and then treated with an organic flotation agent to float off a substantially pure kainite salt. Another known process directed particularly to the recovery of potassium sulfate from salt brines is disclosed in U.S. Pat. No. 3,082,063, Devidalli et al., Mar. 19, 1963, according to which kainite obtained from concentrated salt brines is converted to schoenite plus solid sodium chloride in a solution of magnesium chloride; followed by floating the solid schoenite from the solid sodium chloride and then heating the schoenite with water to convert it to solid potassium sulfate in a solution of potassium sulfate and magnesium sulfate, the latter being recycled to treat additional kainite. However, the mother liquor from the schoenite contains appreciable quantities of sulfate and hence when the mother liquor is sent to waste these sulfate values are lost. The recoveries of potassium sulfate are therefore less than optimum. More importantly, this process also uses the costly flotation step in order to separate the schoenite from the sodium chloride.

According to the present invention advantage is taken of the fact that the double salt kainite is not stable above about 80°C. Above this transition temperature kainite disappears and the following salts appear:

$2MgSO_4 \cdot K_2SO_4$ (langbeinite)
$MgCl_2 \cdot KCl \cdot 6H_2O$ (carnallite).

However, the sodium chloride is not affected by such heating. The instant invention is therefore the discovery that if a salt mixture consisting essentially of kainite and sodium chloride, as produced from Great Salt Lake brines, is slurried for about 1 hour in a magnesium chloride brine at temperature above 80°C, the expected transformation takes place and the langbeinite and carnallite are formed as exceedingly fine crystals while the sodium chloride remains in about the same size as formed orginally in the evaporation ponds. The following are approximations of the particle size differential following heating of the brine evaporites:

Sodium Chloride: 90% between 150 and 1500 microns;
Potassium Salts including Langbeinite: 90% between 5 and 50 microns.

Separation of these fine salt crystals from the coarse sodium chloride is preferably effected in an elutriation column wherein a brine comprising magnesium chloride of 28 to 32% $MgCl_2$ is pumped upwardly at a velocity somewhat in excess of the free falling velocity of the fine salt for effecting optimum separation of the fine langbeinite and carnallite crystals from the coarse sodium chloride. The sodium chloride is removed periodically from the bottom of the column while the potassium salts as fines are carried up in the brine and recovered from the top of the elutriation column in a dilute slurry. Using the process of this invention the sodium chloride content of the original mixed salts can be reduced from about 30% to as low as 3% in the potassium salt slurry which is sufficiently low for using the slurry in subsequent steps for producing potassium sulfate.

The following examples will further illustrate the invention.

EXAMPLE I 100 pounds of harvest salt analyzing approximately 7.23% Mg, 8.50% K, 11.0% Na, 22.63% Cl, and 31.8% $SO_4$, on weight percent basis, were added to a magnesium chloride brine (28% $MgCl_2$) to form a slurry of 30% solids. The slurry was heated for 1 hour at 100°C at the end of which period a portion of the solid was analyzed as comprising about 72% recrystallized potassium salts including langbeinite, about 90% of which had a particle size in the range from 5 to 50 microns; and 28% essentially sodium chloride about 90% which was between 150 and 1500 microns. The slurry at 30% solids was then fed into the middle of an elutriation column measuring about 12 inches in diameter and 5 feet high into the bottom of which a magnesium chloride brine (28% $MgCl_2$) was introduced at a velocity of about 2.5 feet per minute whereby the finely divided potassium salts were carried upwardly into and discharged from the top of the elutriation column as a dilute elutriate of about 10% solids; and the coarse sodium chloride crystals, which had settled to the bottom of the column, were periodically removed. The elutriate analyzed about 3% sodium chloride; the bottom discharge contained 85% sodium chloride.

EXAMPLE II

A second experiment was run similar in all respects to Example I except that 100 pounds of harvest salt were used analyzing approximately 6.75% Mg, 8.4% K, 12.78% Na, 23.76% Cl, and 31.66% $SO_4$ on weight percent basis. The salt was added to a magnesium chloride brine to form a slurry of about 50% solids which was heated for 1 hour at 100°C. A sample of the treated salts analyzed about 68% recrystallized salts consisting essentially of potassium salts about 80% of which had a particle size of from 5 to 50 microns; and 32% sodium chloride about 80% of which was larger than 150 microns. The slurry at 50% solids was then elutriated using a magnesium chloride brine flowing upwardly in the elutriation column at a velocity of about 2.5 feet per minute. The resulting potassium salts were recovered as a dilute slurry of about 15% solids which analyzed about 5% sodium chloride. The bottom discharge analyzed 83% NaCl.

The elutriates of Examples I and II were sufficiently free of sodium chloride that the potassium salts could then be subjected to a solubility type process such as disclosed in the aforesaid Kirk Othmer reference.

While the invention has been described and illustrated with reference to the separation of sodium chloride from harvest salts formed by solar evaporation of Great Salt Lake brines it will be understood that the invention is not limited to this specific embodiment but is comprehensive of treatment of any mixed salts amenable to selective recrystallization for effecting particle size differentiation and separation.

I claim:

1. Process for separating kainite from a mixture of salts comprising essentially kainite and sodium chloride characterized by relatively coarse crystals comprising: slurrying said mixture of salts in a $MgCl_2$ brine, heating the slurry to temperatures above about 80°C. for a predetermind period of time such that said kainite only of said mixture of salts is converted by recrystallization to relatively fine crystals of langbeinite and carnallite in said slurry and thereafter subjecting the slurry to a particle size dependent separation process whereby the fine recrystallized langbeinite and carnallite are separated from the remaining relatively coarse crystalline salts.

2. Process according to claim 1 wherein the salt mixture comprises coarse crystalline deposits derived from naturally occurring brines.

3. Process according to claim 1 wherein the salt mixture comprises coarse crystalline harvest salts derived from brines by solar evaporation.

4. Process according to claim 1 wherein said particle size dependent separation process is effected by elutriation.

5. Process according to claim 3 wherein the salts are mixed with said $MgCl_2$ brine to form a slurry of about 50% solids and the slurry is heated to a temperature above 80°C to as high as about 120°C for about 1 hour to effect conversion of the kainite to the form of relatively fine crystals.

6. In a process for producing potassium sulfate from salt deposits derived from naturally occurring brines wherein said salts comprise essentially a mixture of kainite and sodium chloride of relatively coarse crystal size the improvement comprising: adding said mixture of salts to a brine of from 28 to 32% $MgCl_2$ to form a slurry of about 50% solids, separating the sodium chloride from the kainite by heating said slurry to a temperature above 80° to as high as 120°C. for from one to two hours such that the kainite is converted by recrystallization to the potassium salts langbeinite and carnallite of relatively fine crystal size, separating these potassium salts from the relatively coarse sodium chloride crystals by elutriation, recovering the potassium salts substantially free of sodium chloride and then treating said potassium salts to recover the potassium values as potassium sulfate.

* * * * *